United States Patent
Imai

(10) Patent No.: US 10,887,568 B2
(45) Date of Patent: Jan. 5, 2021

(54) IMAGE PROCESSING APPARATUS, AND IMAGE PROCESSING METHOD

(71) Applicant: SONY SEMICONDUCTOR SOLUTIONS CORPORATION, Kanagawa (JP)

(72) Inventor: Kotaro Imai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/482,332

(22) PCT Filed: Mar. 14, 2018

(86) PCT No.: PCT/JP2018/010079
§ 371 (c)(1),
(2) Date: Jul. 31, 2019

(87) PCT Pub. No.: WO2018/180509
PCT Pub. Date: Oct. 4, 2018

(65) Prior Publication Data
US 2020/0014898 A1    Jan. 9, 2020

(30) Foreign Application Priority Data
Mar. 27, 2017 (JP) .................. 2017-060414

(51) Int. Cl.
*H04N 9/73* (2006.01)
*G08G 1/16* (2006.01)
(Continued)

(52) U.S. Cl.
CPC .............. *H04N 9/735* (2013.01); *B60R 1/00* (2013.01); *G06K 9/00798* (2013.01); *G08G 1/16* (2013.01);
(Continued)

(58) Field of Classification Search
CPC .... H04N 9/735; B60R 1/00; B60R 2300/302; G08G 1/16; G06T 2207/30256; G06K 9/00798; G06K 2207/1012
See application file for complete search history.

(56) References Cited

U.S. PATENT DOCUMENTS

2014/0204267 A1* 7/2014 Akiba ..................... B60R 1/00
   348/362
2017/0364765 A1* 12/2017 Nakata ............... G06K 9/00798
(Continued)

FOREIGN PATENT DOCUMENTS

DE   102014100683 A1    7/2014
EP       3252707 A1   12/2017
(Continued)

OTHER PUBLICATIONS

International Search Report and Written Opinion of PCT Application No. PCT/JP2018/010079, dated May 15, 2018, 07 pages Of ISRWO.

*Primary Examiner* — Tsion B Owens
(74) *Attorney, Agent, or Firm* — Chip Law Group

(57) ABSTRACT

The present technology relates to an image processing apparatus and an image processing method that can appropriately set an attention area in an image on which image correction processing is performed. An image processing apparatus according to an aspect of the present technology includes a speed detecting section that detects a moving speed of the mobile body; an attention area setting section that sets an attention area to an image imaged in an advancing direction of the mobile body on the basis of the moving speed detected; and an image correction processing section that performs the predetermined image correction processing on the image on the basis of a pixel value of a pixel belonging to the attention area on the image. The present (Continued)

technology is applicable to, for example, a vehicle-mounted sensor.

11 Claims, 6 Drawing Sheets

(51) Int. Cl.
  *B60R 1/00* (2006.01)
  *G06K 9/00* (2006.01)
(52) U.S. Cl.
  CPC . *B60R 2300/302* (2013.01); *B60R 2300/8033* (2013.01); *G06K 2207/1012* (2013.01); *G06T 2207/30256* (2013.01)

(56) References Cited

U.S. PATENT DOCUMENTS

2018/0139368 A1\* 5/2018 Nakayama ......... G06K 9/00825
2020/0262347 A1\* 8/2020 Gupta ....................... G06T 7/80

FOREIGN PATENT DOCUMENTS

| JP | 2014-032540 A | 2/2014 |
| JP | 2014-143547 A | 8/2014 |
| WO | 2016/121406 A1 | 8/2016 |

\* cited by examiner

IMAGE PROCESSING APPARATUS, AND IMAGE PROCESSING METHOD

TECHNICAL FIELD

The present technology relates to an image processing apparatus and an image processing method, and, more particularly, to an image processing apparatus and an image processing method such that a detection area for detecting information that becomes a trigger to start predetermined image correction processing is changed depending on a speed or the like.

BACKGROUND ART

For example, it is considered in an automobile to realize a following driving function that detects other automobile traveling front and follows, an automatic brake function that detects jumping-out of a pedestrian and a front obstacle and releases a shock. In this case, it needs a camera that images an image for detecting and identifying surroundings (mainly forward). Then, in order to detect an object such as the other automobile and the pedestrian with high accuracy from the image imaged by the camera, it will be a condition that the image is suitable for detecting the object.

Here, the image suitable for detecting the object means an image imaged with an appropriate exposure and an image on which appropriate image correction processing is performed. Accordingly, in order to obtain the image suitable for detecting the object, it needs to control the exposure or the like before imaging or perform the image correction processing after imaging.

In the image correction processing after imaging, it is known that white balance processing (hereinafter referred to as WB processing) that can especially express correctly a color of the object to be imaged is important to detect the object.

In a case where the image correction processing such as the WB processing is performed on the imaged image, there are a first method of performing the image correction processing on the basis of pixel values of all pixels of the image and a second method of performing the image correction processing on the basis of a pixel value of a pixel belonging to a predetermined area (hereinafter referred to as attention area) (for example, see Patent Literature 1).

CITATION LIST

Patent Literature

Patent Literature 1: Japanese Patent Application Laid-open No. 2014-32540

DISCLOSURE OF INVENTION

Technical Problem

In the case of the above-described first method, since the image correction processing is performed also on the basis of the pixel values in an area at which the object is not present, a result of the image correction processing may not be appropriate for detecting the object.

In the case of the above-described second method, in order to obtain the result of the image correction processing suitable for detecting the object, it becomes important to appropriately set a position of the attention area.

The present technology is made in view of the above-mentioned circumstances, and it is an object of the present technology to appropriately set the attention area in the image on which the image correction processing is performed.

Solution to Problem

An image processing apparatus according to an aspect of the present technology includes a speed detecting section that detects a moving speed of the mobile body; an attention area setting section that sets an attention area to an image imaged in an advancing direction of the mobile body on the basis of the moving speed detected; and an image correction processing section that performs the predetermined image correction processing on the image on the basis of a pixel value of a pixel belonging to the attention area on the image.

An image processing method for an image processing apparatus included in a mobile body according to an aspect of the present technology includes the steps executed by the image processing apparatus of detecting a moving speed of the mobile body; setting an attention area to an image imaged in an advancing direction of the mobile body on the basis of the moving speed detected; and performing the predetermined image correction processing on the image on the basis of a pixel value of a pixel belonging to the attention area on the image.

According to an aspect of the present technology includes, the moving speed of the mobile body is detected, the attention area is set to the image imaged in the advancing direction of the mobile body on the basis of the moving speed detected, and the predetermined image correction processing is performed on the image on the basis of the pixel value of the pixel belonging to the attention area on the image.

Advantageous Effects of Invention

According to an aspect of the present technology, the attention area can be set appropriately in the image on which the image correction processing is performed.

According to an aspect of the present technology, the image that can accurately detect the object.

It should be noted that the effects described here are not necessarily limitative and may be any of effects described in the present disclosure.

MODE(S) FOR CARRYING OUT THE INVENTION

Hereinafter, modes for carrying out the present technology (hereinafter, referred to as embodiments) will be described with reference to the drawings.

<Configuration Example of Image Processing Apparatus According to the Present Technology>

Figure 1:
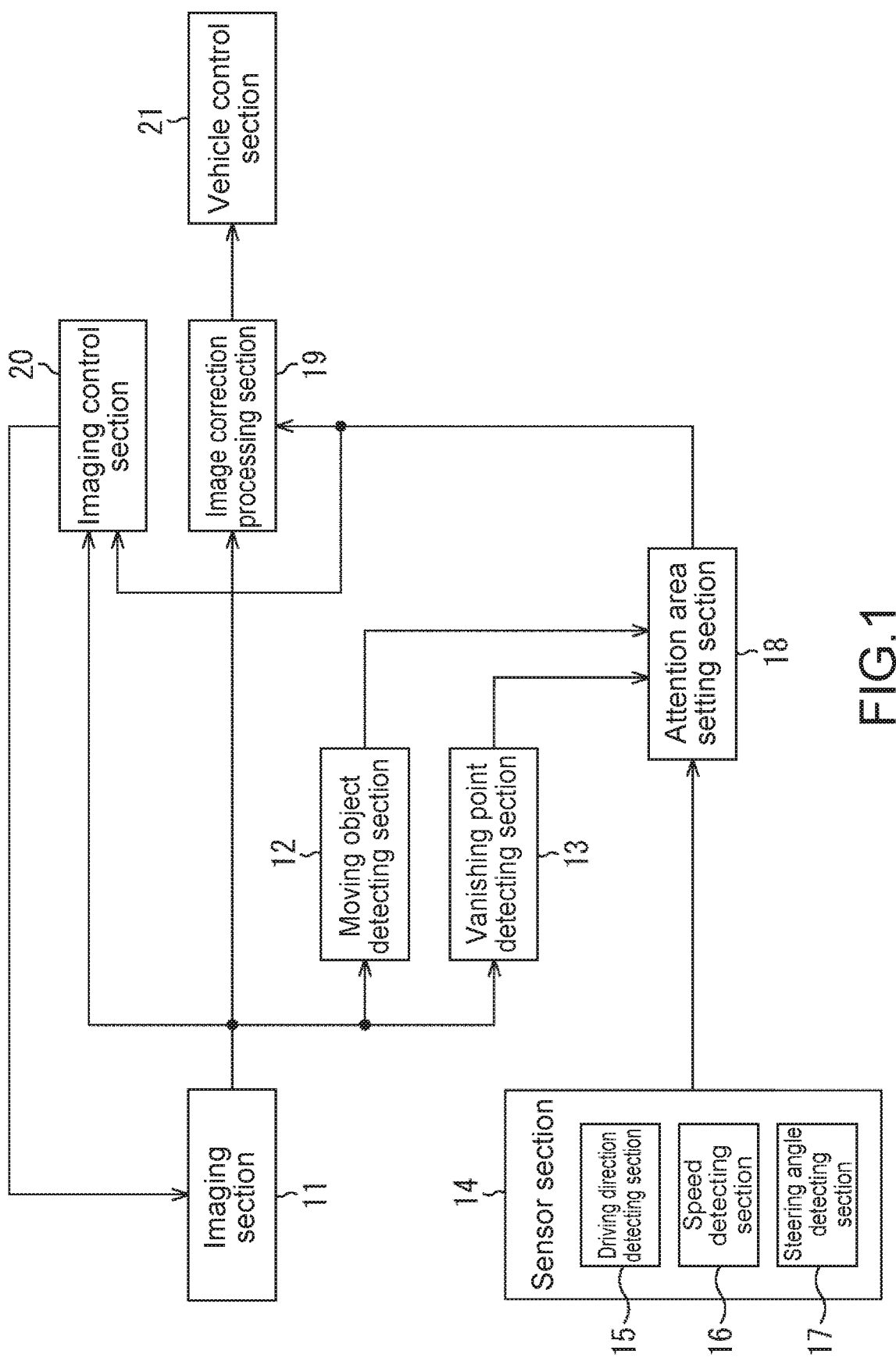
FIG. 1 is a block diagram depicting a configuration example of an image processing apparatus to which the present technology is applied.

FIG. 1 is a block diagram depicting a configuration example of an image processing apparatus according to the present technology.

The image processing apparatus is included in a vehicle of an automobile and detects an object such as other automobile and a pedestrian that can be present at surroundings (mainly forward). A detection result of the image processing apparatus is used by a variety of functions (details described later) such as a following driving function and an automatic brake function in the vehicle including the image processing apparatus.

Note that the vehicle including the image processing apparatus is not limited to an automobile.

The image processing apparatus includes an imaging section 11, a moving object detecting section 12, a vanishing point detecting section 13, a sensor section 14, an attention area setting section 18, an image correction processing section 19, an imaging control section 20, and a vehicle control section 21.

The imaging section 11 at least includes a front camera that can image a front in a usual advancing direction of the vehicle, performs imaging at a predetermined frame rate, and sequentially outputs an imaged image to the moving object detecting section 12, the vanishing point detecting section 13, the image correction processing section 19, and the imaging control section 20. Note that the imaging section 11 may include a rear camera that can image a back in an unusual advancing direction of the vehicle.

The moving object detecting section 12 detects the object actually moving in a real space (moving object) by comparing a plurality of whole images (all angles of view) at different imaging timings. Specifically, the moving object detecting section 12 does not detect a building that is relatively moved as seen from the vehicle including the image processing apparatus but is not moved in the real space, and detects other vehicles and the like traveling similar to the vehicle. The moving object detecting section 12 notifies the attention area setting section 18 of moving object detection information that represents a detection result of the moving object.

The vanishing point detecting section 13 detects a vanishing point in the image by comparing the plurality of whole images (all angles of view) at different imaging timings serially inputted from the imaging section 11. Here, the vanishing point refers to a point on which parallel lines present in the real space (for example, white lines of word marking, guardrails, or the like) are finally crossed. The vanishing point detecting section 13 notifies the attention area setting section 18 of vanishing point information that represents a position of the detected vanishing point.

The sensor section 14 includes a driving direction detecting section 15, a speed detecting section 16, and a steering angle detecting section 17.

The driving direction detecting section 15 detects a travel direction (forward or backward) of the vehicle including the image processing apparatus and notifies the attention area setting section 18 of travel direction information representing the travel direction. The speed detecting section 16 detects a speed of the vehicle including the image processing apparatus and notifies the attention area setting section 18 of speed information representing the speed. The steering angle detecting section 17 detects a steering angle (rotation angle of steering handle) of the vehicle including the image processing apparatus and notifies the attention area setting section 18 of steering angle information representing the steering angle.

The attention area setting section 18 sets the attention area on the basis of the moving object detection information, the vanishing point information, the travel direction information, the speed information, and the steering angle information and notifies the image correction processing section 19 and the imaging control section 20 of attention area information that represents a position and a size thereof.

Here, the attention area represents a pixel area taking as a standard upon the image correction processing in a case where predetermined image correction processing (for example, WB processing) is performed on the image imaged by the imaging section 11 in the image correction processing section 19.

The image correction processing section 19 performs the predetermined image correction processing on the all angles of view of the image sequentially inputted from the imaging section 11 on the basis of a pixel value of the pixel in the attention area of each image. Examples of the predetermined image correction processing include the WB processing, y correction processing, sharpening processing, noise reduction processing, and the like. Note that the predetermined image correction processing is not limited to the above-described examples.

The image correction processing section 19 supplies the image on which the predetermined image correction processing is performed to a control section (not shown) at a vehicle side via the vehicle control section 21. The image on which the predetermined image correction processing is performed and that is supplied to the control section at the vehicle side is used to execute a following driving function, an automatic brake function, or the like in the vehicle.

The imaging control section 20 performs exposure control of the imaging section 11 on the basis of the image sequentially inputted from the imaging section 11. At this time, the exposure control may be performed on the basis of the pixel value of the pixel in the attention area of the image sequentially inputted from the imaging section 11.

<Operation of Image Processing Apparatus According to Embodiment of the Present Technology>

Figure 2:
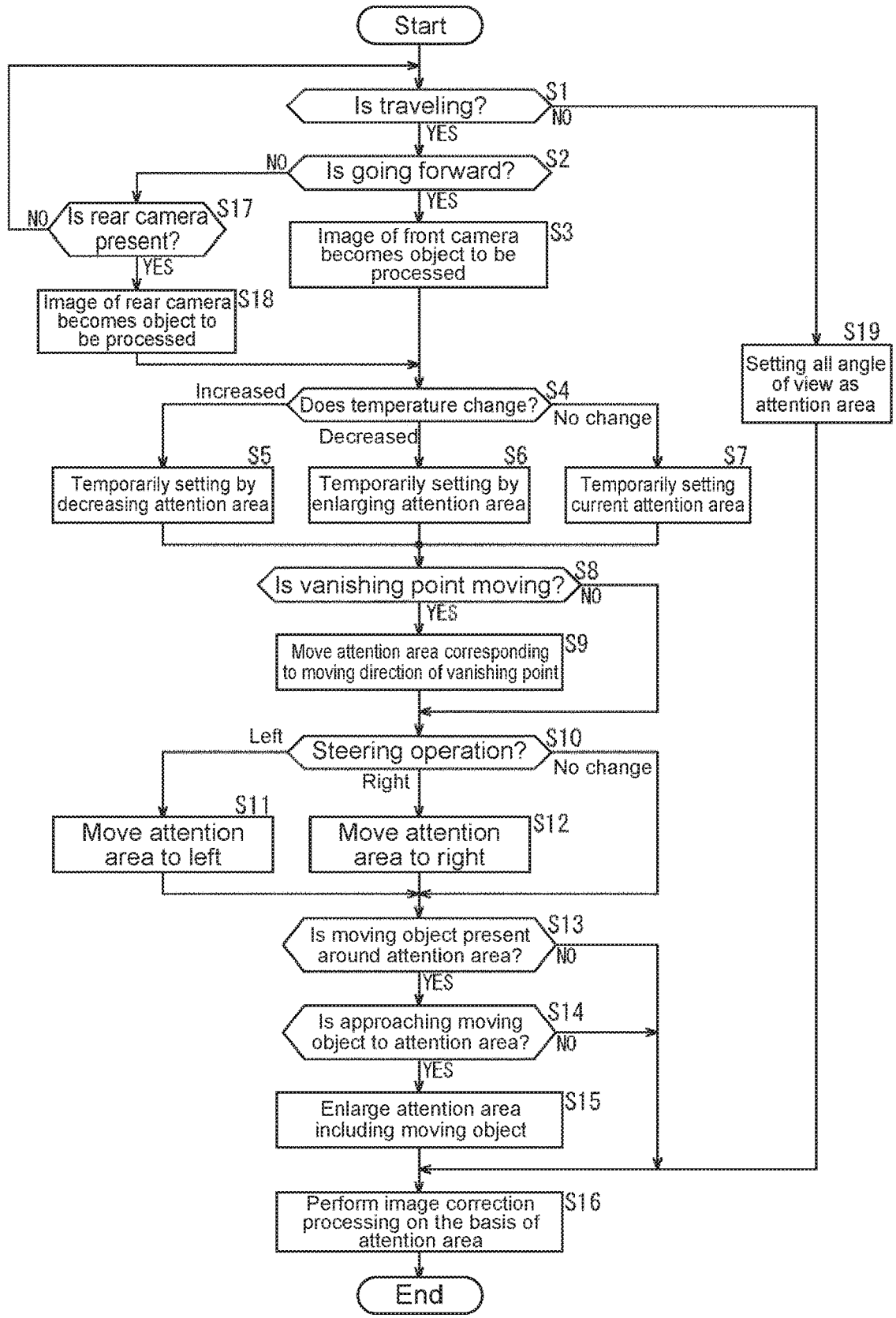
FIG. 2 is a flowchart explaining an operation of the image processing apparatus of FIG. 1.

FIG. 2 is a flowchart explaining an operation of the image processing apparatus. The operation is repeatedly executed at a predetermined period after the vehicle including the image processing apparatus can be traveled (for example, ignition switch is turned on).

In an initial stage that the operation is started, the attention area is in a position (for example, center of image) and has a size at an initial setting, or is in a position and has a size in the state that the vehicle is not traveled last time (for example, ignition switch is turned off).

In Step S1, the attention area setting section 18 determines whether or not the vehicle is traveled on the basis of the speed information. In a case where it is determined as traveling, the processing proceeds to Step S2. In Step S2, the attention area setting section 18 determines whether or not the vehicle goes forward on the basis of the travel direction information. In a case where it is determined that it goes forward, the processing proceed to Step S3.

In Step S3, the imaging section 11 supplies the image being imaged by the front camera that images a front of the vehicle as object to be processed to a latter stage.

In Step S4, the attention area setting section 18 determines whether or not the speed of the vehicle is increased as compared to that at the time of processing in Step S4 at the former time (whether or not an amount of increase in the speed is a predetermined threshold or more), whether or not the speed is decreased (whether or not an amount of decrease in the speed is the predetermined threshold or more), or whether or not the speed is not changed (whether or not an amount of change in the speed is less than the predetermined threshold value) on the basis of the speed information.

In Step S4, in a case where it is determined that the speed is increased, the processing proceeds to Step S5 by the attention area setting section 18. In Step S5, the attention area setting section 18 temporarily sets to decrease the size of the current attention area. Thereafter, the processing proceeds to Step S8.

In Step S4, in a case where it is determined that the speed is decreased, the processing proceeds to Step S6 by the attention area setting section 18. In Step S6 the attention area setting section 18 temporarily sets to increase the size of the current attention area. Thereafter, the processing proceeds to Step S8.

In Step S4, in a case where it is determined that the speed is not changed, the processing proceeds to Step S7 by the attention area setting section 18. In Step S7, the attention area setting section 18 temporarily sets to keep the size of the current attention area. Thereafter, the processing proceeds to Step S8.

In Step S8, the attention area setting section 18 determines whether or not the vanishing point is moved as compared to that at the time of processing in Step S8 at the former time on the basis of the vanishing point information. In a case where it is determined that the vanishing point is moved, the processing proceeds to Step S9 by the attention area setting section 18 and the attention area is caused to be moved so that the vanishing point becomes the center. Note that, in Step S8, in a case where it is determined that the vanishing point is not moved, Step S9 is skipped.

In Step S10, the attention area setting section 18 determines the state whether or not the steering handle of the vehicle is turned left, is turned right, or is in the center not turning left and right on the basis of the steering angle information.

In Step S10, in a case where it is determined that the state is that the steering handle is turned left, the processing proceeds to Step S11 by the attention area setting section 18 and the attention area is caused to be moved to a left side depending on the steering angle. Note that instead of moving the attention area to the left side, the attention area may be extended to the left side. Thereafter, the processing proceeds to Step S13.

In Step S10, in a case where it is determined that the state is that the steering handle is turned right, the processing proceeds to Step S12 by the attention area setting section 18 and the attention area is caused to be moved to a right side depending on the steering angle. Note that instead of moving the attention area to the right side, the attention area may be extended to the right side. Thereafter, the processing proceeds to Step S13.

In Step S10, in a case where it is determined that the state is that the steering handle is in the center, Steps S11 and S12 are skipped and the processing proceeds to Step S13 by the attention area setting section 18.

In Step S13, the attention area setting section 18 determines whether or not the moving object is being detected around the attention area (periphery with predetermined width of attention area) on the basis of the moving object detection information. In a case where the moving object is being detected, the processing proceeds to Step S14 by the attention area setting section 18. The attention area setting section 18 determines whether or not the detected moving object approaches the attention area. In a case where it is determined that the detected moving object approaches the attention area, the processing proceeds to Step S15 by the attention area setting section 18.

In Step S15, the attention area setting section 18 enlarges the attention area to include the moving object that is present around the attention area and approaches the attention area. Thereafter, the processing proceeds to Step S16.

Note that, in Step S13, in a case where it is determined that the moving object is not detected, or, in Step S14, in a case where the moving object does not approach the attention area, the processing proceeds to Step S16.

In Step S16, the attention area setting section 18 notifies the image correction processing section 19 and the imaging control section 20 of the attention area information that represents the attention area set by the above-described processing. The image correction processing section 19 performs the predetermined image correction processing on the basis of the pixel value of the pixel in the attention area on the image inputted from the imaging section 11 on the basis of the notified attention area information and outputs the resultant image to the latter stage.

Note that, in Step S2, in a case where it is determined that the vehicle does not go forward (go backward), the processing proceeds to Step S17 by the attention area setting section 18.

In Step S17, the imaging section 11 determines whether or not the vehicle includes the rear camera that images a rear of the vehicle. In a case where it is determined that the vehicle includes the rear camera, the processing proceeds to Step S18 and the image imaged by the rear camera that images the rear of the vehicle is supplied to the latter stage as the object to be processed. Thereafter, the processing proceeds to Step S4 and the above-described processing is executed.

In Step S17, in a case where it is determined that the imaging section 11 does not include the rear camera, the processing returns to Step S1 and subsequent steps are executed.

In Step S1, in a case where it is determined as not traveling, the processing proceeds to Step S19. In Step S19, the attention area setting section 18 sets the all angles of view of the image to the attention area. Thereafter, the processing proceeds to Step S16.

This concludes the description about the operation of the image processing apparatus.

Figure 3:
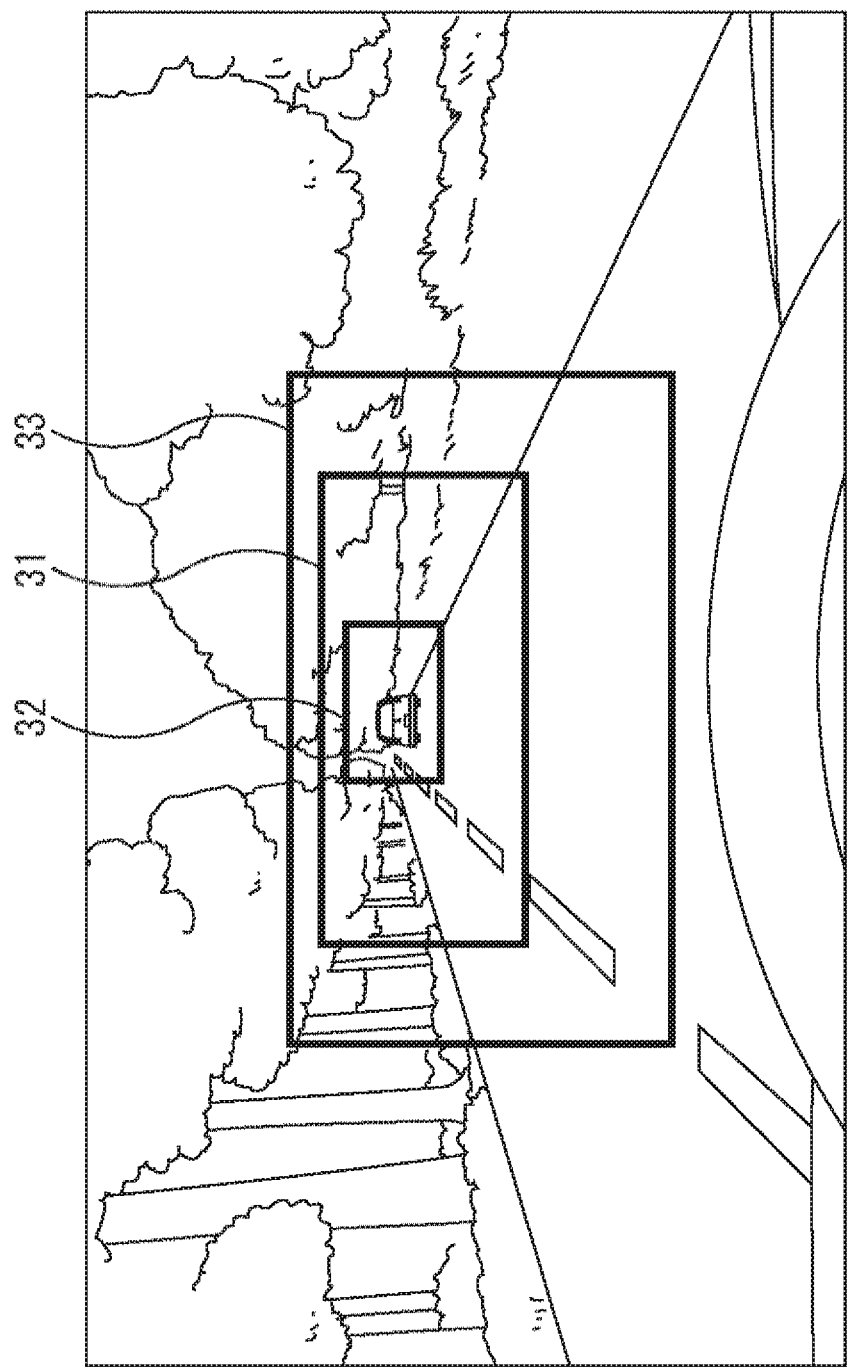
FIG. 3 is a diagram depicting a change of an attention area corresponding to a speed.

Next, FIG. 3 is a diagram depicting a change of the attention area and depicts the all angles of view of the image imaged by the imaging section 11.

As described above, by the image processing apparatus, the size of the current attention area is decreased or increased depending on the speed of the vehicle including the image processing apparatus. Specifically, it assumes that the size of the attention area at the current speed is a frame 31. If the speed is increased, the size of the attention area is decreased to a frame 32 since it takes a short time to approach the vanishing point. In contrast, if the speed is decreased, the size of the attention area is increased to a frame 33 since it takes a long time to approach the vanishing point.

In addition, the attention area is moved corresponding to a moving direction of the vanishing point. Specifically, in a case where a traveling road is curved left or right or is uphill or downhill, the attention area is moved up, down, left, or right.

Furthermore, also in a case where the steering handle of the vehicle is turned left or right, the attention area is moved left or right.

As described above, since the attention area is changed corresponding to the state of the vehicle and the shape of the road by the image processing apparatus, appropriate image correction processing can be performed on the basis of the information (pixel value of pixel in attention area) about a place to which the vehicle travels.

For example, in a case where the vehicle travels near a tunnel exit, there will be a significant difference between brightness at a tunnel inner wall for most of the angles of view and brightness at the tunnel exit ahead. By using the image processing apparatus, appropriate image correction processing can be performed on the basis of the information about the tunnel exit ahead (outside of tunnel) without being affected by a color of a sodium lamp or the like in the tunnel.

For example, in a case where the vehicle travels near a tunnel exit, there will be a significant difference between brightness at a tunnel inner wall for most of the angles of view and brightness at the tunnel exit ahead. By using the image processing apparatus, appropriate image correction processing can be performed on the basis of the information about the tunnel exit ahead (outside of tunnel) without being affected by information about the inside of the tunnel. More specifically, appropriate WB processing can be performed on the basis of the information about the (outside of tunnel) without being affected by the sodium lamp or the like in the tunnel.

In addition, for example, in a case where a number of taxies, i.e., the vehicles with both sides coated in yellow, travel, inappropriate WB processing may be performed by misrecognizing the yellow for most of the angles of view as a light source color if not the attention area is set. However, since the attention area is set by the image processing apparatus, appropriate WB processing can be performed.

Thus, at the latter stage of the image processing apparatus, the object can be detected with high accuracy from the image on which the image correction processing is performed and the following driving function and it becomes possible to appropriately execute the automatic brake function, and the like.

<About Functions of Vehicle Capable of Using Image on which Image Correction Processing is Performed Outputted from Image Processing Apparatus>

As being described above, the image on which the image correction processing is performed outputted from the image processing apparatus can be applied to a variety of functions that can be included in the vehicle.

For example, the image can be applied to a function of automatically controlling a vehicle speed and a distance between vehicles in matching with a vehicle traveling forward, a function of automatically steering in matching with a shape and a state of a road, a function of warning a risk of colliding with other vehicle or the like, a function of warning a deviation from a travel lane, a function of detecting a brake light of a forward vehicle, a function of recognizing a road sign and controlling a speed, a function of controlling an irradiation range of a high beam, a function of switching a high beam and a low beam, a function of appropriately combining the above-described functions, or the like.

Incidentally, a series of processing of the above-described image processing apparatus can be executed not only by hardware but also by software. When the series of processing is executed by software, a program for the software is installed in a computer. Examples of the computer include a computer built in dedicated hardware, a general purpose personal computer, for example, capable of executing a variety of functions by installing a variety of programs, and the like.

Figure 4:
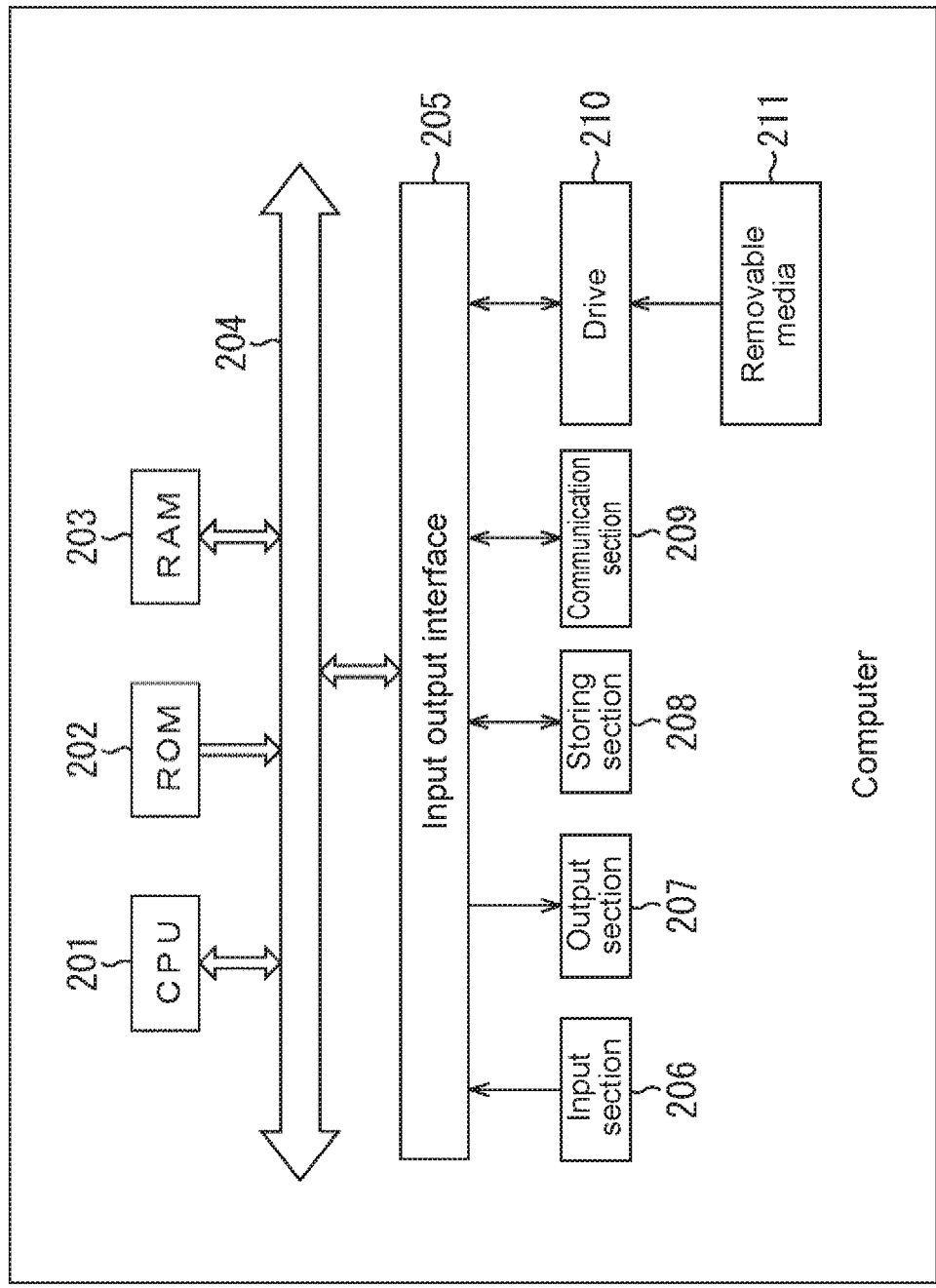
FIG. 4 is a block diagram depicting an example of schematic configuration of a general purpose computer.

FIG. 4 is a block diagram depicting an example of schematic configuration of hardware of a computer that executes the above-described series of processing by a program.

In a computer 200, a CPU (Central Processing Unit) 201, a ROM (Read Only Memory) 202, and a RAM (Random Access Memory) 203 are connected each other via a bus 204.

To the bus 204, an input output interface 205 is further connected. To the input output interface 205, an input section 206, an output section 207, a storing section 208, a communication section 209, and a drive 210 are connected.

The input section 206 includes a keyboard, a mouse, a microphone, and the like. The output section 207 includes a display, a speaker, and the like. The storing section 208 includes a hard disk, a non-volatile memory, and the like. The communication section 209 includes a network interface, and the like. The drive 210 drives removable media 211 such as a magnetic disk, an optical disk, a magneto-optical disk, and a semiconductor memory.

In the computer 200 configured as described above, the above-described series of processing is performed by loading and executing the program stored in the storing section 208 by the CPU 201 via the input output interface 205 and the bus 204.

The program executed by the computer (CPU 201) may be provided by recording in the removable media 211 as package media or the like, for example. In addition, the program may be provided via wired or wireless transmission media such as a local area network, the Internet, and digital satellite broadcasting.

In the computer 200, the program can be installed to the storing section 208 via the input output interface 205 by placing the removable media 211 on the drive 210. Also, the program can be installed to the storing section 208 by receiving at the communication section 209 via the wired or wireless transmission media. Otherwise, the program can be installed to the ROM 202 or the storing section 208 in advance.

Note that the program executed by the computer 20 may be a program that is processed in time-series following the order as described in the present specification or a program that is processed at a necessary timing, e.g., in parallel, upon invoking, or the like.

<Application Example for Mobile Body>

The technology of the present disclosure (the present technology) can be applied to a variety of products. For example, the technology of the present disclosure may be realized as a device included in any type of a mobile body such as an automobile, an electric automobile, a hybrid electric automobile, a motorcycle, a bicycle, personal mobility, an airplane, a drone, a ship, a robot, and the like.

Figure 5:
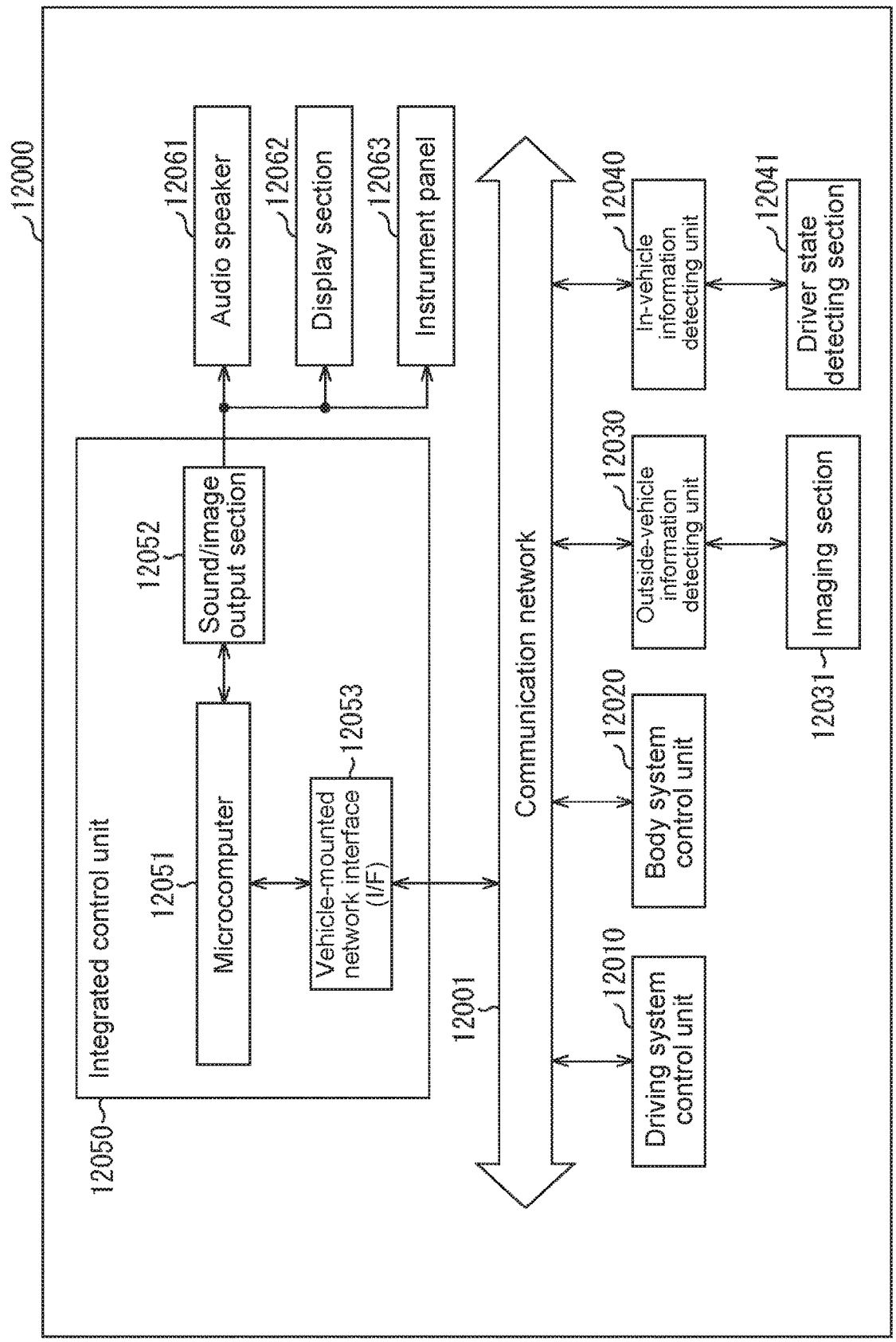
FIG. 5 is a block diagram depicting an example of schematic configuration of a vehicle control system.

FIG. 5 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 5, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 5, an audio speaker 12061, a display section 12062, and an instrument panel 12063 are illustrated as the output device. The display section 12062 may, for example, include at least one of an on-board display and a head-up display.

Figure 6:
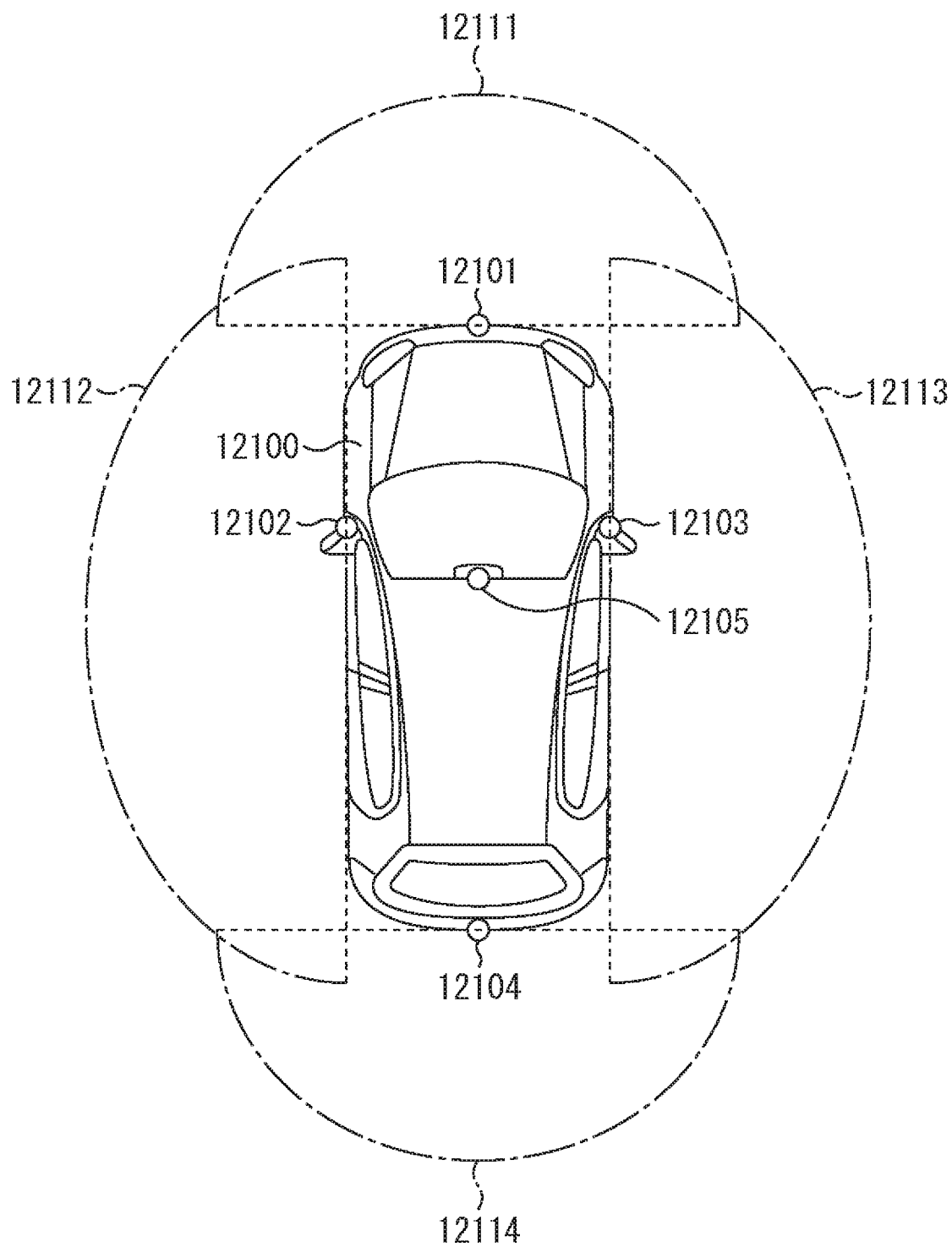
FIG. 6 is a diagram of assistance in explaining an example of installation positions of an outside-vehicle information detecting section and an imaging section.

FIG. 6 is a diagram depicting an example of the installation position of the imaging section 12031.

In FIG. 6, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 6 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

As above, an example of the vehicle control system to which the technology of the present disclosure can be applied has been described. The technology of the present disclosure can be applied to the outside-vehicle information detecting unit 12030 among the configurations as described above.

Note that the embodiments of the present technology are not limited to the above-described embodiments. Various modifications and alterations of the present technology may be available without departing from the spirit and scope of the present disclosure.

Note that the present technology may also have the following structures.

(1)

An image processing apparatus included in a mobile body, including:

a speed detecting section that detects a moving speed of the mobile body;

an attention area setting section that sets an attention area to an image imaged in an advancing direction of the mobile body on the basis of the moving speed detected; and an image correction processing section that performs the predetermined image correction processing on the image on the basis of a pixel value of a pixel belonging to the attention area on the image.

(2)

The image processing apparatus according to (1), in which the attention area setting section sets a size of the attention area on the basis of the moving speed detected.

(3)

The image processing apparatus according to (1) or (2), further including:

a vanishing point detecting section that detects a vanishing point of the image imaged in the advancing direction of the mobile body, in which the attention area setting section sets a position of the attention area on the basis of the vanishing point detected.

(4)

The image processing apparatus according to (3), in which the attention area setting section makes the position of the attention area move corresponding to a moving direction of the vanishing point detected.

(5)

The image processing apparatus according to any of (1) to (4), further including:

a steering angle detecting section that detects a steering angle of the mobile body, in which the attention area setting section makes the position of the attention area move on the basis of the steering angle detected.

(6)
  The image processing apparatus according to any of (1) to (4), further including:
    a steering angle detecting section that detects a steering angle of the mobile body, in which
    the attention area setting section enlarges the attention area in a direction corresponding to the steering angle detected.
(7)
  The image processing apparatus according to any of (1) to (6), further including:
    a moving object detecting section that detects a moving object from the image imaged in the advancing direction of the mobile body, in which
    the attention area setting section enlarges the attention area on the basis of a detection result of the moving object.
(8)
  The image processing apparatus according to any of (1) to (7), in which
    the image correction processing section performs the predetermined image correction processing on all angles of view of the image imaged in the advancing direction of the mobile body on the basis of a pixel value of a pixel belonging to the attention area on the image.
(9)
  The image processing apparatus according to any of (1) to (8), in which
    the image correction processing section performs white balance processing as the predetermined image correction processing on all angles of view of the image imaged in the advancing direction of the mobile body on the basis of a pixel value of a pixel belonging to the attention area on the image.
(10)
  The image processing apparatus according to any of (1) to (9), further including:
    an imaging section that images and generates the image in the advancing direction of the mobile body.
(11) The image processing apparatus according to (10), further including:
    an imaging control section that controls exposure of the imaging section on the basis of a pixel value of a pixel belonging to the attention area on the image.
(12) The image processing apparatus according to (10) or (11), in which
    the imaging section includes a front camera that images a front of the mobile body and a rear camera that images a rear of the mobile body.
(13) An image processing method for an image processing apparatus included in a mobile body, including the steps executed by the image processing apparatus of:
    detecting a moving speed of the mobile body;
    setting an attention area to an image imaged in an advancing direction of the mobile body on the basis of the moving speed detected; and
    performing the predetermined image correction processing on the image on the basis of a pixel value of a pixel belonging to the attention area on the image.

REFERENCE SIGNS LIST 11 imaging section
12 moving object detecting section
13 vanishing point detecting section
14 sensor section
15 driving direction detecting section
16 speed detecting section
17 steering angle detecting section
18 attention area setting section
19 image correction processing section
20 imaging control section
21 vehicle control section

The invention claimed is:
1. An image processing apparatus in a mobile body, the image processing apparatus comprising:
  an imaging section configured to capture an image in an advancing direction of the mobile body;
  a speed detecting section configured to detect a moving speed of the mobile body;
  a vanishing point detecting section configured to detect a vanishing point in the captured image;
  an attention area setting section configured to:
    set an attention area in the captured image based on the detected moving speed; and
    set a position of the attention area in the captured image based on the detected vanishing point; and
  an image correction processing section configured to execute an image correction processing operation on the captured image based on a pixel value of a pixel corresponding to the attention area in the captured image.

2. The image processing apparatus according to claim 1, wherein
  the attention area setting section is further configured to set a size of the attention area based on the detected moving speed.

3. The image processing apparatus according to claim 1, wherein
  the attention area setting section is further configured to move the position of the attention area in a direction corresponding to a moving direction of the detected vanishing point.

4. The image processing apparatus according to claim 2, further comprising:
  a steering angle detecting section configured to detect a steering angle of the mobile body, wherein
  the attention area setting section is further configured to move the position of the attention area based on the detected steering angle.

5. The image processing apparatus according to claim 2, further comprising:
  a steering angle detecting section configured to detect a steering angle of the mobile body, wherein
  the attention area setting section is further configured to enlarge the attention area in a direction corresponding to the detected steering angle.

6. The image processing apparatus according to claim 2, further comprising:
  a moving object detecting section configured to detect a moving object from the captured image, wherein
  the attention area setting section is further configured to enlarge the attention area based on the detected moving object.

7. The image processing apparatus according to claim 2, wherein
  the image correction processing section is further configured to execute the image correction processing operation on all angles of view of the captured image based on the pixel value of the pixel corresponding to the attention area in the captured image.

8. The image processing apparatus according to claim 2, wherein
  the image correction processing section is further configured to execute a white balance processing operation as the image correction processing operation on all angles of view of the captured image based on the pixel value of the pixel corresponding to the attention area in the captured image.

9. The image processing apparatus according to claim 1, further comprising:
an imaging control section configured to control an exposure of the imaging section based on the pixel value of the pixel corresponding to the attention area in the captured image.

10. The image processing apparatus according to claim 1, wherein the imaging section includes:
a front camera configured to capture a front of the mobile body; and
a rear camera configured to capture a rear of the mobile body.

11. An image processing method, comprising:
in an image processing apparatus in a mobile body:
capturing an image in an advancing direction of the mobile body;
detecting a moving speed of the mobile body;
detecting a vanishing point in the captured image;
setting an attention area in the captured image based on the detected moving speed;
setting a position of the attention area in the captured image based on the detected vanishing point; and
executing an image correction processing operation on the captured image based on a pixel value of a pixel corresponding to the attention area in the captured image.

* * * * *